(12) United States Patent
Wu

(10) Patent No.: US 7,895,177 B2
(45) Date of Patent: Feb. 22, 2011

(54) ENABLING SEARCHING OF USER RATINGS AND REVIEWS USING USER PROFILE LOCATION, AND SOCIAL NETWORKS

(75) Inventor: Su-Lin Wu, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 473 days.

(21) Appl. No.: 11/754,855

(22) Filed: May 29, 2007

(65) Prior Publication Data

US 2008/0301112 A1  Dec. 4, 2008

(51) Int. Cl.
*G06F 7/00* (2006.01)
*G06F 17/30* (2006.01)

(52) U.S. Cl. .................... 707/706; 707/748; 707/772
(58) Field of Classification Search .......... 707/3, 707/706, 748, 772
See application file for complete search history.

(56) References Cited

U.S. PATENT DOCUMENTS

| | | | | |
|---|---|---|---|---|
| 5,950,172 | A * | 9/1999 | Klingman | 705/26 |
| 6,199,067 | B1 * | 3/2001 | Geller | 707/10 |
| 6,343,317 | B1 | 1/2002 | Glorikian | |
| 6,963,848 | B1 * | 11/2005 | Brinkerhoff | 705/10 |
| 7,013,289 | B2 * | 3/2006 | Horn et al. | 705/26 |
| 7,065,494 | B1 * | 6/2006 | Evans | 705/10 |
| 7,565,157 | B1 * | 7/2009 | Ortega et al. | 455/456.2 |
| 7,822,751 | B2 * | 10/2010 | O'Clair et al. | 707/748 |
| 2001/0032175 | A1 * | 10/2001 | Holden et al. | 705/37 |
| 2002/0046259 | A1 | 4/2002 | Glorikian | |
| 2005/0080786 | A1 * | 4/2005 | Fish et al. | 707/10 |
| 2006/0042483 | A1 * | 3/2006 | Work et al. | 101/91 |
| 2006/0074883 | A1 * | 4/2006 | Teevan et al. | 707/3 |
| 2006/0155609 | A1 * | 7/2006 | Caiafa | 705/26 |
| 2006/0200453 | A1 * | 9/2006 | Santrosyan et al. | 707/3 |
| 2006/0247980 | A1 * | 11/2006 | Mirrashidi et al. | 705/26 |
| 2007/0060109 | A1 * | 3/2007 | Ramer et al. | 455/414.1 |
| 2007/0061301 | A1 * | 3/2007 | Ramer et al. | 707/3 |
| 2007/0067305 | A1 * | 3/2007 | Ives | 707/10 |
| 2008/0147773 | A1 * | 6/2008 | Aaron | 709/201 |
| 2008/0255977 | A1 * | 10/2008 | Altberg et al. | 705/35 |
| 2008/0255989 | A1 * | 10/2008 | Altberg et al. | 705/40 |

OTHER PUBLICATIONS

Zawodny, Jeremy, "A9's Search Diary", 5 pgs., jeremy.zawodny.com/blog/archives/002611.html, (accessed Aug. 1, 2007).
Reviews from Epinions, 3 pgs, epinions.com, (accessed Aug. 1, 2007).
Google Notebook, 3 pgs., google.com/accounts/ServiceLogin?service=notebook&passive=true&nui=1&continue=http%, (accessed Aug. 1, 2007).
Yahoo! Answers, 2 pgs., answers.yahoo.com, (accessed Aug. 1, 2007).
Yahoo! Local Features, 2 pgs., local.yahoo.com/features, (accessed Aug. 1, 2007).

* cited by examiner

*Primary Examiner*—Yicun Wu
*Assistant Examiner*—Pavan Mamillapalli
(74) *Attorney, Agent, or Firm*—Frommer Lawrence & Haug LLP; Jamie L. Wiegand

(57) ABSTRACT

A system and method are directed towards a free-form search query of user reviews using user profile, location information, and/or social networks, to obtain a result having an associated universal aggregated rating. The user may enter in free-form a search query that may then be transparently modified using the user's profile, social network, and/or current physical location. The search results may then be presented to the user along with aggregated weighted ratings. The user may also enter products and/or services into a data store, including comments, and a universal rating. In one embodiment, the user may provide a tag to another reviewer's comments that may be useable to aggregate ratings. In one embodiment, the user's profile, location, and/or social networking information may be used to further annotate the user's inputs.

19 Claims, 7 Drawing Sheets

ENABLING SEARCHING OF USER RATINGS AND REVIEWS USING USER PROFILE LOCATION, AND SOCIAL NETWORKS

TECHNICAL FIELD

The present invention relates generally to search queries over a network and, more particularly, but not exclusively, to refining a free-form search query by employing a user profile, location information, and/or social network information, to modifying at least one search query term to obtain a result having a universal aggregated rating.

BACKGROUND

A typical shopper today may use multiple sources of information to make a decision about what to buy, where to eat, what merchant or business to use, even where to hold a child's birthday party. For example, today's shopper may perform an on-line web search, visit a brick-and-mortar store, or even ask friends, family members, or the like to obtain information.

While more and more shoppers may be turning to on-line based searches, historically, such searches have been unable to supplant the roles taken by browsing in a physical store, or asking friends for recommendations. At least one reason for this may be that today's on-line based searches tend to lend themselves to focused searches when the shopper is fairly clear on what they want to buy. However, less focused "browsing" remains challenging for the on-line shopper, often providing confusing and sometimes useless results. For example, a shopper that may not know a lot about cameras, may still frequent a particular store to check out the camera selection, even if their intended purchase is from a different store, or ultimately over the Internet. Internet browsing, however, may result in a large quantity of time spent at the wrong websites, less informative websites, or the like. Thus, the kind of browsing done in a brick-and-mortar store that may lead to buying has often been difficult to transfer to the Internet.

Moreover, although a shopper may conduct their research for a purchase on-line, many shoppers will still seek out and consult with their friends regarding the proposed purchase. This may be the case, in spite of finding plenty of reviews from "experts." This phenomenon may arise because shoppers still seek an opinion from someone they know and trust, and may share their "frame of reference."

In addition, performing a search query for user relevant information may remain cumbrous. For example, products, and reviews and ratings of products may be arranged predominately by product or by a myriad of different companies that may provide the product or service. However, it is often difficult to find a review relevant to what the shopper may want, unless the shopper already has a specific product or company in mind. Thus, the shopper might have to perform several search queries to obtain relevant search results. Irrelevant search results mean that the shopper is less likely to find when they are looking for, which in turn may translate into lost opportunities for merchants, or other businesses, to prosper from the on-line shopping experience.

Once the shopper has selected to purchase the product or service, it may not be easy to provide their opinion about their purchase on-line. For example, the shopper has to choose between the store they purchased from, other stores, or a myriad of websites to provide their opinion. Unfortunately, other websites where the product is also advertised may not have access to the shopper's opinion. Thus, future searchers might not ever be aware of the shopper's purchase experience. Therefore, many businesses and shoppers are searching for new ways to make search results and feedback mechanisms more relevant to the shopper. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
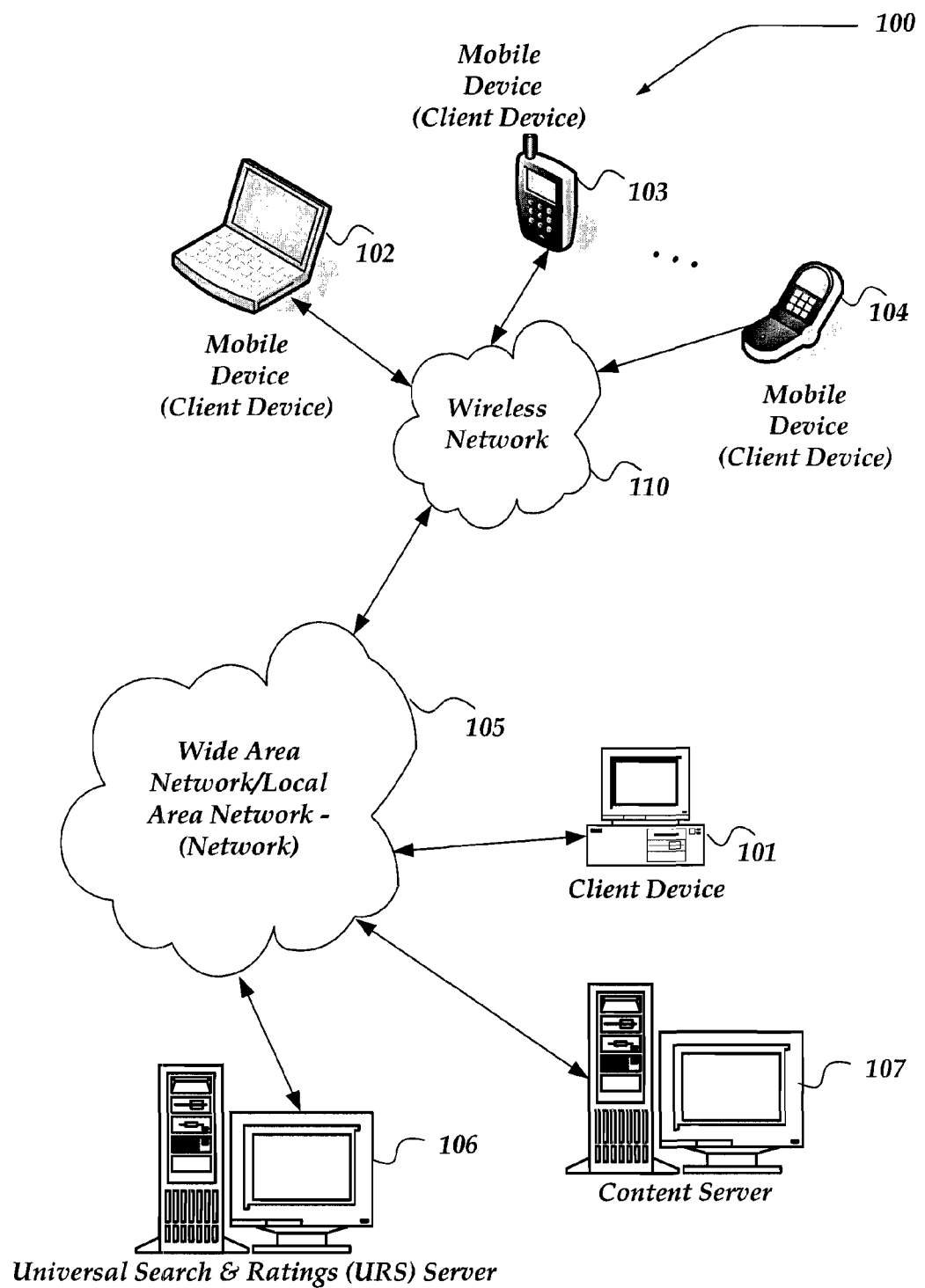
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "social network" refers to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

Briefly stated the present invention is directed towards using a free-form search query of user ratings and reviews and employing a user profile, location information, and/or social network information to modify at least one search query term to obtain a result having an associated universal aggregated rating. In one embodiment, a user may provide a free form search query. In one embodiment, the search query comprises a list of associated words. In one embodiment, a user's profile, about the user, and/or the user's social network may be employed to modify the search query. For example, where the user seeks to purchase a product at a store, but forgot a brand type of the product, the user's profile, and/or information within the user's social network, may be used to transparently modify the search query. In one embodiment, the user's current physical location may also be used to transparently modify the search query, such as identifying a city, a store location, or the like, as part of the search query. In one embodiment, the user may also provide an input to modify the search, based on location, a specific sub-set of their social network, or the like.

The search may then be performed upon a data store that is based on an aggregated rating score and review that may be determined from word or phrase commonality between the search terms and terms within reviews in the data store. A search result may then be presented to the user along with aggregated weighted ratings. In one embodiment, the search result may include access to comments provided by the reviewers.

The user may also enter a product and/or service information into the data store, including comments, and a universal rating for the product and/or service. In one embodiment, the user may provide a tag to another reviewer's comments that may be useable to aggregate ratings. In one embodiment, the user's profile, location, and/or social networking information may be used to further annotate the user's inputs.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Universal Search & Rating (USR) server 106, client devices 101-104, and content server 107.

Mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to perform a search over a network. However, another application may also be used to perform a search over the network.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to USR server 106, client device 101, or other computing devices.

In one embodiment, mobile devices 102-104 may also provide a current physical location to another computing device. In one embodiment, mobile devices 102-104 may provide the current physical location information in terms of a latitude and longitude, or the like. However, mobile devices 102-104 may also provide other information that may be employed to determine a current physical location of the device, including for example, a MAC address, IP address, or the like. Such location information may be provided in a separate message, sent as part of another message, or even as a combination of the above. In one embodiment, physical location information may be provided on demand, or based on a time period, an event, or the like.

Mobile devices 102-104 may further be configured to include a client application that enables the end-user to log into an end-user account that may be managed by another computing device, such as USR server 106, or the like. Such end-user account, for example, may be configured to enable the end-user to receive emails, send/receive IM messages, SMS messages, access selected web pages, enter a user profile, participate in a social networking activity, perform search queries, or the like. However, participation in various social networking activities; performing search queries; providing ratings of a product, business, service, or the like; as well as other communication activities, may also be performed without logging into the end-user account.

Client device 101 may include virtually any computing device capable of communicating over a network to send and receive information, including social networking information, performing search queries, or the like. Client device 101 may also include client applications, browser applications, messaging applications, and the like, such as those described above, as well as being configured to provide location information. Such location information may include, but is not limited to a network address from which a physical location may be determined, a physical location, or even an account, user name, or the like, from which a location may be determined.

The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple USR server 106 and its components with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between USR server 106, client device 101, and other computing devices.

Additionally, communication media typically embodies computer-readable instructions, data structures, program modules, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of USR server 106 is described in more detail below in conjunction with FIG. 3. Briefly, however, USR server 106 may include any computing device capable of connecting to network 105 to enable aggregation and management of social networking information, review and rating information for a product, service, business, or the like, and to receive and perform refined search queries employing at least some of the social networking, review/rating information, location information, and/or a user profile.

USR server 106 may receive from various participants in a social network, information including information associated with activities, events, messages, communications, address books, buddy lists, or the like. USR server 106 may also receive social networking information from a variety of other sources including, for example, content server 107. USR server 106 may store at least some of the received information for use in generating a location refined search query.

USR server 106 may also receive user profile information from a user. Such user profile information may include, but is not limited to a user's fixed location, address, age, gender, name, avatar, employment, hobbies, or the like. In one embodiment, the user may be presented with a survey that may be useable to obtain additional information about the user. In one embodiment, the user may also provide information about friends, family, or other social networking relationships. For example, the user may provide an address book, buddy list, contact list, or the like. In addition, in one embodiment, USR server 106 may monitor on-line activities of the user to determine social networking relationships, update contact lists, or the like.

USR server 106 may be configured to receive a request for a search. In one embodiment, the search may be provided in a free-form context. USR server 106 may then parse the search query into one or more sub-phrases. USR server 106 may also employ the location modifiers, user profile information, and/or social networking information, to refine the search query. USR server 106 may then perform the modified search on a data store that includes aggregated review and ratings data for various products and/or services. However, the data store is not constrained to enabling searches on products and/or services. For example, the data store may be configured to enable searches for locations. For example, the data store may enable searches based on such questions as to which local fire stations in a given city or town may provide tours for kid's birthday parties, or the like. In any event, USR server 106 may provide a result based on weighted aggregated scores for the responses. Thus, USR server 106 enables a shopper to find and discover highly-rated items in arbitrary categories.

USR server 106 further provides an interface for a shopper to input a review and/or rating, and a mechanism for aggregating results over a plurality of users. Moreover, as mentioned above, it enables users to keep track of products and/or services they have used and might use again in a convenient and searchable location. Furthermore, the aggregated search results may be searchable based on a user's social network, profile, and/or social network. USR server 106 may employ processes such as are described below in conjunction with FIGS. 4-6 to perform at least some of its actions.

Devices that may operate as USR server 106 include various network devices, including, but not limited to personal computers desktop computers, multiprocessor systems, microprocessor-based or programmable consumer electronics, network PCs, servers, network appliances, and the like.

Although FIG. 1 illustrates USR server 106 as a single computing device, the invention is not so limited. For example, one or more functions of USR server 106 may be distributed across one or more distinct computing devices. For example, managing various social networking activities and/or performing modified search queries, may be performed by a plurality of computing devices, without departing from the scope or spirit of the present invention.

Content server 107 represents a variety of content and/or that may useable client devices 101-104. Such services include, but are not limited to web services, third-party services, audio services, video services, email services, merchant services, calendaring services, photo services, or the like. Moreover, information about the content and/or services provided by content server 107 may be employed to provide results to a search query.

Devices that may operate as content server 107 include personal computers desktop computers, multiprocessor systems, microprocessor-based or programmable consumer electronics, network PCs, servers, and the like.

Illustrative Mobile Client Environment

Figure 2:
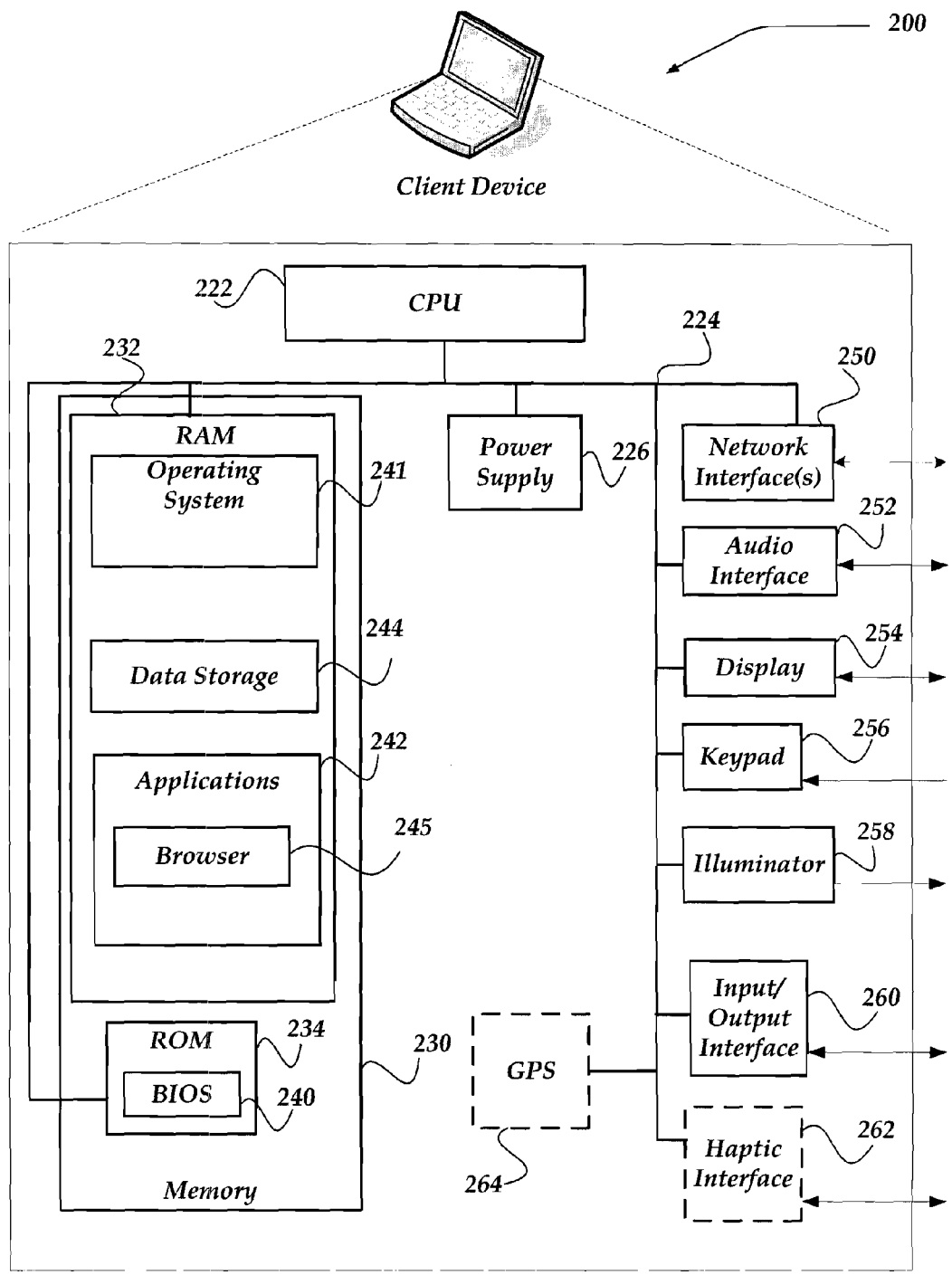
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises an optional input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, or the like. At least a portion of the social networking information may also be stored on a disk drive or other storage medium (not shown) within client device 200. Moreover, some of the social networking information may be stored on a remote computing device and accessed through client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. One application shown in the figure is browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable access to a search application, interface, or the like, such as might be available through USR server 106 of FIG. 1. In one embodiment, a user of client device 200 may input to the search application a variety of search terms for use in obtaining a search results. Mobile device 245 may also provide location information, or information useable in determining its physical location. Such location information, may, in one embodiment, be useable to automatically (e.g., transparent to a user input) modify the search query.

Illustrative Server Environment

Figure 3:
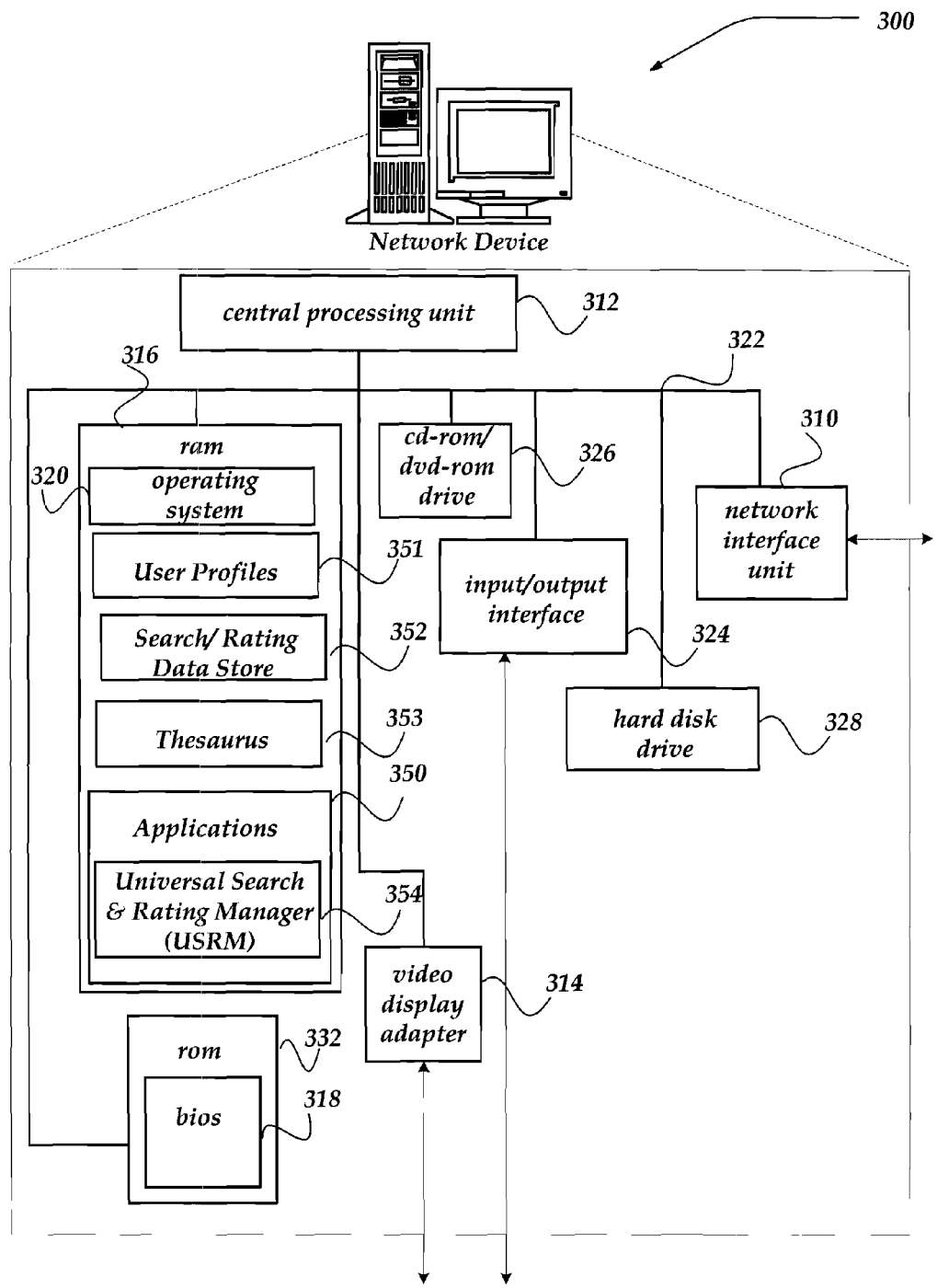
FIG. 3 shows one embodiment of a network device that may be useable as a universal search & ratings server.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, USR server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, User Profiles (UDS) 351 may include a database, text, spreadsheet, folder, file, or the like, that may be configured to maintain and store user profile information, including, but not limited to social networking information, including, but not limited to contact information including a contact name and at least one address or physical location associated with the contact name. The contact name may include an alias, a user name, or the like. The address may include an email address, an IM address, SMS address, a telephone number, IP address, or other information that may be useable to determine a physical location for the contact name. User profile information may include a user's preference of various products, services, or the like, age, employment, location information, gender, or the like. In one embodiment, at least some of the user profile information may be obtained through a result of a survey that the user may participate within.

In one embodiment, contact information may also be from or within a user's IM friends list, a buddy list, an address book, email history log, an IM conversation log, a VOIP store, or the like. However, the contact information may also be obtained indirectly through monitoring various interactions of a user. Thus, for example, the contact information may be extracted based on content within a message between the user and another member of a social network. For example, in one embodiment, the user and the other member may include information about a third person, or the like. Such third person information may also be obtained, in one embodiment, and stored within user profiles 351. Similarly, various network behavior of a user, or other social networking member, may also be obtained, including, for example, websites visited, types of information searched for by the user, types of content downloaded, where the content is downloaded from, or the like. Information may also be obtained from another member's social networking contact information which may be useable for modifying a search by the user. Thus, second or higher degree of separation information may also be obtained from other members of the social network, and stored within user profiles 351. In one embodiment, such information may be arranged and configured into a hierarchical relationship based, for example, on degrees of separation.

In one embodiment, location information based on a user's physical location, account registration information, or the like, may also be stored within user profiles 351. Such information may indicate that the user resides in a particular town, neighborhood, city, or the like, within a particular county, state, country, or the like. Such location information may also be configured and arranged, in one embodiment, in a hierarchical relationship.

Mass memory may further include search/rating data store 352. Search/rating data store 352 may include a database, text, spreadsheet, folder, file, or the like, that may be configured to maintain and store search terms and phrases provided by one or more users, including product and/or service providers. In one embodiment, the search/rating data includes rating data provided by a user and/or product/service provider. In another embodiment, at least some of the rating data may be aggregated over a plurality of inputs. In one embodiment, search/rating data store 352 may also include user entered tags that enable additional searches to be performed on the data. For example, a user may enter a user specific tag, or general use tag for an item in search/rating data store 352. In one embodiment, the user specific tag may be identified to the user through the user's profile, account identifier, or similar identifier. Moreover, ratings may also be identified to the user that provided the rating. In this way, items within the search/rating data store 352 may be searched based on the user that input a rating. Ratings may also be evaluated and feedback may be provided to the user that input the rating. For example, in one embodiment, a rating provider may be able obtain feedback that their rating was used by another search user. When they look at a list result, they might be shown how many times their rating opinion were included in a search result provided to other users. Being able to see tangible impact of ones ratings may enable the user to obtain positive feedback, which in turn may further encourage users to provide additional ratings. Associating a user to their input also enables the invention to create and maintain a quality of review validation for the inputs.

In addition, mass memory may include thesaurus 353 which is configured to enable disambiguation. For example, where several terms may be combined into a single phrase, thesaurus 353 may provide such context. Moreover, where a term may be mean one thing within one geographic region and mean another thing within another geographic region, thesaurus 353 may also include such information. Thus, for example, where "Trader Joe's" may refer to a store in one location, it may refer to a restaurant in another location. Moreover, "TJs" may refer to "Trader Joe's" in one location, a clothing store in another location, or a bar/grill in yet another location. Such distinctions may be managed within thesaurus 353. Similarly, thesaurus 353 may also include commonly misspellings, slang, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Universal Search & Rating Manager (USRM) 354 may also be included as an application program within applications 350.

USRM 354 is configured and arranged to manage modified searches or ratings and reviews based in part on a user profile, and/or social networking information to provide aggregated search rating results. USRM 354 further enables a user to input universal ratings and/or comments for any of a variety of items, including, but not limited to products, services, businesses, or the like.

USRM 354 may provide an interface for a user to provide rating inputs, and allow searching of other's input lists, terms, or the like. Moreover, USRM 354 may enable the searches to be transparently, in one embodiment, limited to the searcher's social network, geographical location, or based on information from the searcher's user profile.

USRM 354 may be arranged to provide the interface such that the user may enter inputs in a free form. That is, in one embodiment, the user may provide input independent of a predetermined category. In one embodiment, the interface may be configured to provide an input box for free form entry of terms, phrases, comments, or the like. For example, in one embodiment, the user can compose, or otherwise provide and enter virtually any phrase into the free form input box. In one embodiment, the input box might be constrained to a limited number of words, lines, or the like. For example, in one embodiment, the input box might be constrained to a single line phrase. However, the invention is not so limited, and the input box, might not be constrained in another embodiment. One embodiment of a possible interface is described in more detail below in conjunction with FIG. 7.

In one embodiment, an initial analysis may be performed on the input to determine whether there may be terms, phrases, or the like, to be disambiguated. Such disambiguation may be transparently resolved, in one embodiment, through use of the user's user profile, preferences, social network, or the like. In one embodiment, a current physical location may also be used to attempt to disambiguate the input. In one embodiment, USRM 354 may employ thesaurus 353 to assist in the disambiguation. In one embodiment the disambiguation may be performed by requesting clarification from the user. For example, in one embodiment, a product, service, location, business, or other keyword might be requested from the user.

In one embodiment, the user may also be provided with buttons, dials, icons, or the like, to select a rating to be associated with the input. In one embodiment, the ratings may be in the form of stars; however, the invention is not so constrained, and other visual rating structures may be used. In one embodiment, a range for the ratings is pre-defined, and may be from zero to some n value, such as five, or the like.

USRM 354 may also receive a search query from a user. The search query may also be entered using a free form input box, form, or the like. In one embodiment, the input box may be substantially similar to the free form input box useable to receive text with ratings. In one embodiment, the search query may be transparently modified based, in part, on the searcher's user profile, preferences, location, social network, or the like. Ambiguities may similarly be resolved based on the user's profile, location, social network, preferences, or the like. In one embodiment, USRM 354 may request additional information from the searcher to assist in disambiguating any terms, phrases, or the like.

For example, a user may select to employ USRM 354 to enter a comment, such as "I think Trader Joe's organic ketchup is the best ever." In one embodiment, the user may provide a rating, such as five stars, or the like. Where the phrase "Trader Joe's" may be interpreted as ambiguous, various information such as mentioned above, may be used to resolve the ambiguity. When another person, such as the user's spouse, friend, or the like, performs a free form search query for "ketchup," the searcher's social network's inputs to search/rating/review data store 352 may be used to search for and provide results, such as:

| Ketchup | **** (10 reporting) |
| Heinz ketchup | **** (5 reporting) |
| Trader Joe's organic ketchup | ***** (5 reporting) |
| Ketchup in barbecue sauce | ** (2 reporting) |
| Safeway brand ketchup | ** (2 reporting) |

An entry of "Trader Joe's organic ketchup" would contribute to ratings for each word and each possible sub phrase in the text. A "10 reporting" might indicate how many reviews contributed to the score, to enable the searcher to evaluate how much to believe a rating. In another embodiment, the searcher may select to revise the factors used to modify their search query. Thus, the searcher may select to enter a term to specify a larger or smaller social networking group, such as family, friends, demographic, or even all, which might result in more global search results. Similarly, the searcher might enter a different location, or specify a business. For example, the searcher might also enter "Trader Joe's." In this instance, in one embodiment, the search results might return rated entries related to "Trader Joe's." Similarly, the searcher might select to perform the search within a particular city, town, or the like, and exclude other search entries provided by users from other areas.

USRM 354 may be configured to employ a variety of mechanisms in which to perform and provide to a searcher an aggregated rating response, based on recognition that users may input their comments in free-form using potentially different terms to describe the same product/service. In one embodiment, the contributions of a rated review may be distributed across all reasonable sub phrases of an input. For example, in one embodiment, for a string of words X of length N, a list of all possible sub phrases may be generated for a given review. The review may contribute to the aggregated rating for all sub phrases, in addition to the entire string (review). The aggregated rating for a string of words Y may then be determined by a weighted average of all ratings from contributing reviews, where the weight is a function of a fraction of the words in the sub phrase over the total number of words N in the contributing review X. It should be clear however, that other algorithms may also be employed without departing from the scope of the invention. For example, in one embodiment the function may be determined based on empirical research. In any event, in one embodiment, phrases may be returned for a particular query may be ranked by relevance to the query, how meaningful the phrase is, and/or an averaged rating.

To present one example, suppose an input review gave five stars for "Trader Joe's organic ketchup." USRM 354 might employ thesaurus 353, the searcher's current location, or the like, and recognize "Trader Joe's" as a single named entity. Thus, the following resulting weights might be generated for sub-phrases in the review:

| Trader Joe's | 0.333 |
| Trader Joe's organic | 0.666 |
| Organic ketchup | 0.666 |
| Organic | 0.333 |
| Ketchup | 0.333 |
| Trader Joe's ketchup | 0.666 |
| Trader Joe's organic ketchup | 1.000 |

The aggregated rating for "Trader Joe's" may then be a weighted average of all contributing phrases from relevant reviews. For example, reviews such as "apples at Trader Joe's," or "Trader Joe's enchilada," or even "customer service at Trader Joe's is great," may all contribute based on similar weightings to a result for a search query for "Trader Joe's."

As another example, assume that a search seeks to know an overall rating for Trader Joe's. Further assume, for simplicity, that the following three rating comments are provided:

| Trader Joe's rice | rating: * |
| Trader Joe's ketchup | rating: ** |
| Trader Joe's bread | rating: *** |

In the above example, USRM 354 might again recognize that "Trader Joe's" as a single named entity, thus providing ½ to each of the weighted comments. Thus, in one embodiment, to obtain a total rating, USRM 354 might perform the following to obtain an average aggregated rating of:

$$2=(½(1)+½(2)+½(3))/(1.5)$$

Clearly, the above is merely an example of one embodiment of a possible mechanism for determining an aggregated weighted average rating. It should not be considered, however, as limiting the invention in any manner and is merely provided to illustrate use of the invention. Thus, other algorithms may be employed without departing from the scope of the invention. In any event, USRM 354 may employ processes such as described below in conjunction with FIGS. 4-6.

Generalized Operation

Figure 4:
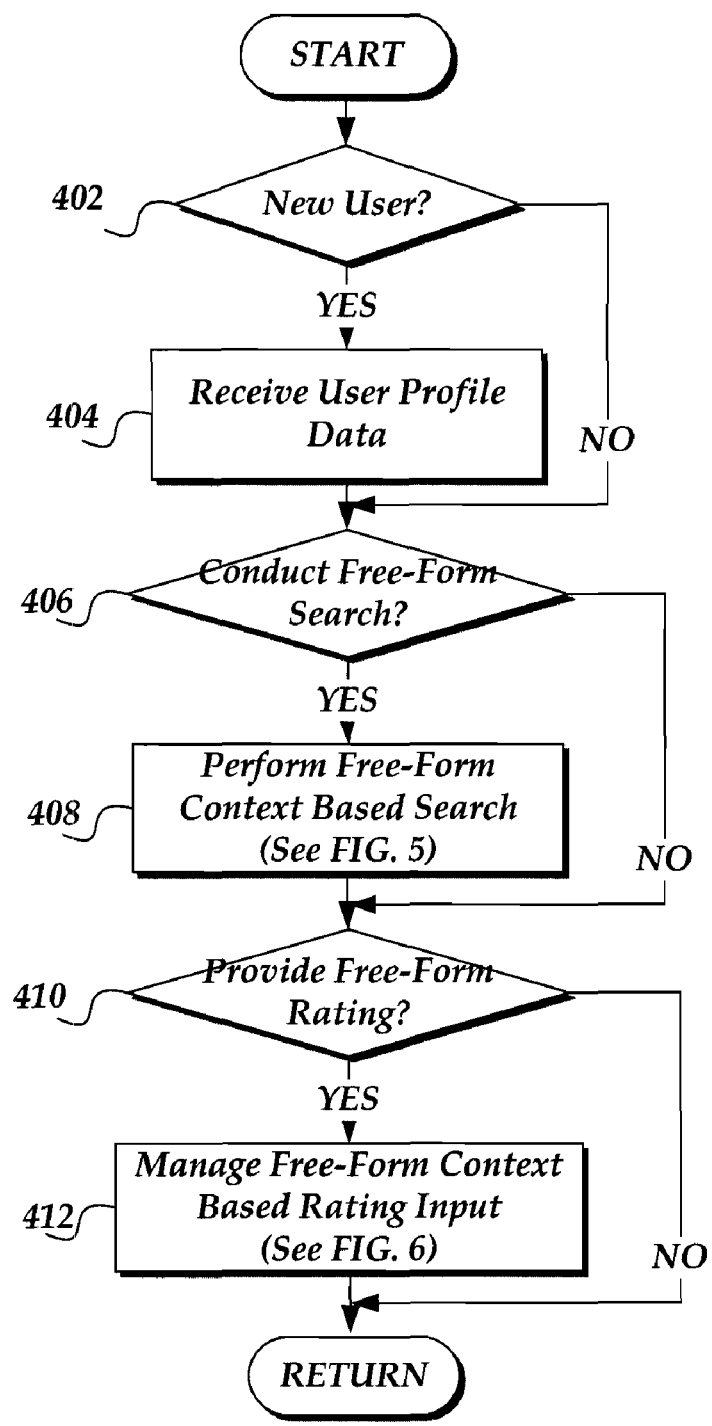
FIG. 4 illustrates a logical flow diagram generally showing one embodiment of an overview process for managing free-form context based searches and ratings.

The operation of certain aspects of the invention will now be described with respect to FIGS. 4-6. FIG. 4 illustrates a logical flow diagram generally showing one embodiment of an overview process for managing free-form context based searches and ratings.

Process 400 of FIG. 4 begins, after a start block, at decision block 402, where a determination is made whether the user of the aggregated search query interface is a new user. That is, has the user provided a user profile, social networking information, or the like? Identification of whether the user is a new user may be based on a variety of factors, including, without limit, a network address provided by the client device being used by the user, an account identifier, name, alias, or the like, that the user may provide, or any of a number of other mechanisms. For example, to employ the invention, in one embodiment, the user might be asked to log into an account.

While the invention does not require such information, having such information may enable transparent modifications of search queries to enable personalization of the search results. It may further enable the user to quickly identify when their comments have been used by others. In any event, if the user is new, processing flows to block 404; otherwise, processing flows to decision block 406. It should be noted, however, that the user is not precluded from modifying user information at any time; thus, although not illustrated, the user may also be provided with a capability of selecting to modify their user information.

At block 404, user information may be obtained. Such information may be obtained using a variety of mechanisms, including having the user fill in a survey, provide results from another survey performed elsewhere, identify buddy lists, identify an account identifier, user name, or the like, from which the process may obtained user information, or the like. As noted above, such user information includes, but is not limited to user profile information, preferences, social networking information, or the like.

Processing proceeds next to decision block 406 where a determination is made whether the user is to conduct a free-form search. If so, processing continues to block 408; otherwise, processing branches to decision block 410.

One embodiment of block 408 is described in more detail below in conjunction with FIG. 5. Briefly, however, the user may provide a free-form search query that enables the user to obtain results that are weighted based on universal aggregated ratings from a plurality of users.

Processing next continues to decision block 410, where a determination is made whether the user is to provide a free-form rating on a product/service, business, or the like. If so, processing continues to block 412; otherwise, processing may return to a calling process to perform other actions.

One embodiment of block 412 is described in more detail below in conjunction with FIG. 6. Briefly, however, at block 412, the user may provide their comments in a free-form context, using, for example, the free-form entry screen described below in conjunction with FIG. 7. Processing then returns to a calling process to perform other actions.

Figure 5:
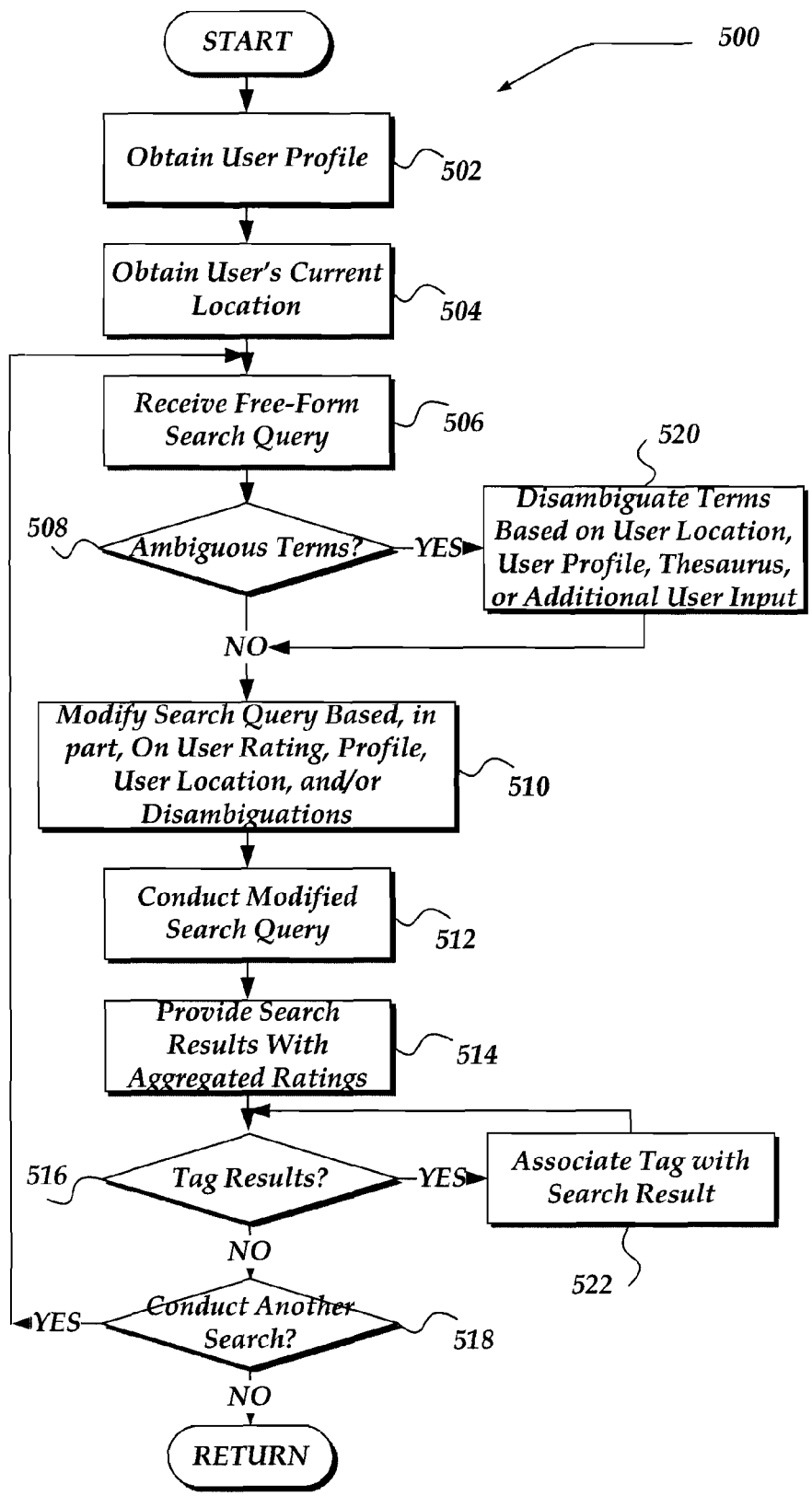
FIG. 5 illustrates a logical flow diagram generally showing one embodiment of an overview process for managing free-form context based search queries.

FIG. 5 illustrates a logical flow diagram generally showing one embodiment of an overview process for managing free-form context based search queries. Process 500 of FIG. 5 illustrates one possible embodiment of block 408 of process 400. However, the invention is not so limited, and other processes may also be employed.

Process 500 begins, after a start block, at block 502, where, if available, a user's profile, social networking information, and the like, may be obtained. In one embodiment, the user's profile, social network, and the like, may be obtained from a data store, based on information the user may have provided, or obtained through the user's permission based on tracking a user's networking behaviors. In one embodiment, the social networking information may be constrained to the user's family, friends, or even based a variety of other degrees of separation. For example, in one embodiment, information about the user's contacts, or the like, for first degree of separation relationships may be obtained for use in modifying the search (and/or later a comment).

Processing continues next to block 504, where a current location of the user may be determined. In one embodiment, the client device for which the user is using may provide such information. In one embodiment, the user might be asked.

Process 500 continues next to block 506, where the user may provide in free-form a search query that includes one or more search terms. Processing flows next to decision block 508 where a determination is made whether any of the terms may be ambiguous. If a term is determined to be ambiguous, processing flows to block 520 where disambiguation may be performed. In one embodiment, an attempt to disambiguate the term(s) may be performed based on the user's information, a thesaurus of known disambiguated terms for the user and/or similarly related users, or the like. In one embodiment, the user's current location might be employed to attempt to disambiguate the term(s). For example, if the user is currently located in a Trader Joe's store, such location may be used to disambiguate a search term of "TJ's." In any event, if disambiguation is not readily determined, in one embodiment, the user might be asked to clarify the term(s).

Processing then continues to block 510, where the search query may be further modified based, in part, on the user's profile, previous rating inputs for a related product/service, or the like, the user's location, social network information, and/or disambiguations from block 520.

Process 500 continues next to block 512, where using the modified search query, processing continues to block 514, where the results of the search query may be returned with weighted aggregated ratings.

Continuing to decision block 516, a determination is made whether the user is to tag the results with identifiers that may be useable to constraint or focus future searches. If not, processing flows to decision block 518. If so, then processing flows to block 522 where the user may input one or more user-defined tags for the results. Processing then loops back to decision block 516 until the user determines that no more tags are to be provided.

Processing proceeds to decision block 518 where a determination is made whether the user is to conduct another search query. If so, processing loops back to block 506; otherwise, processing returns to a calling process to perform other actions.

Figure 6:
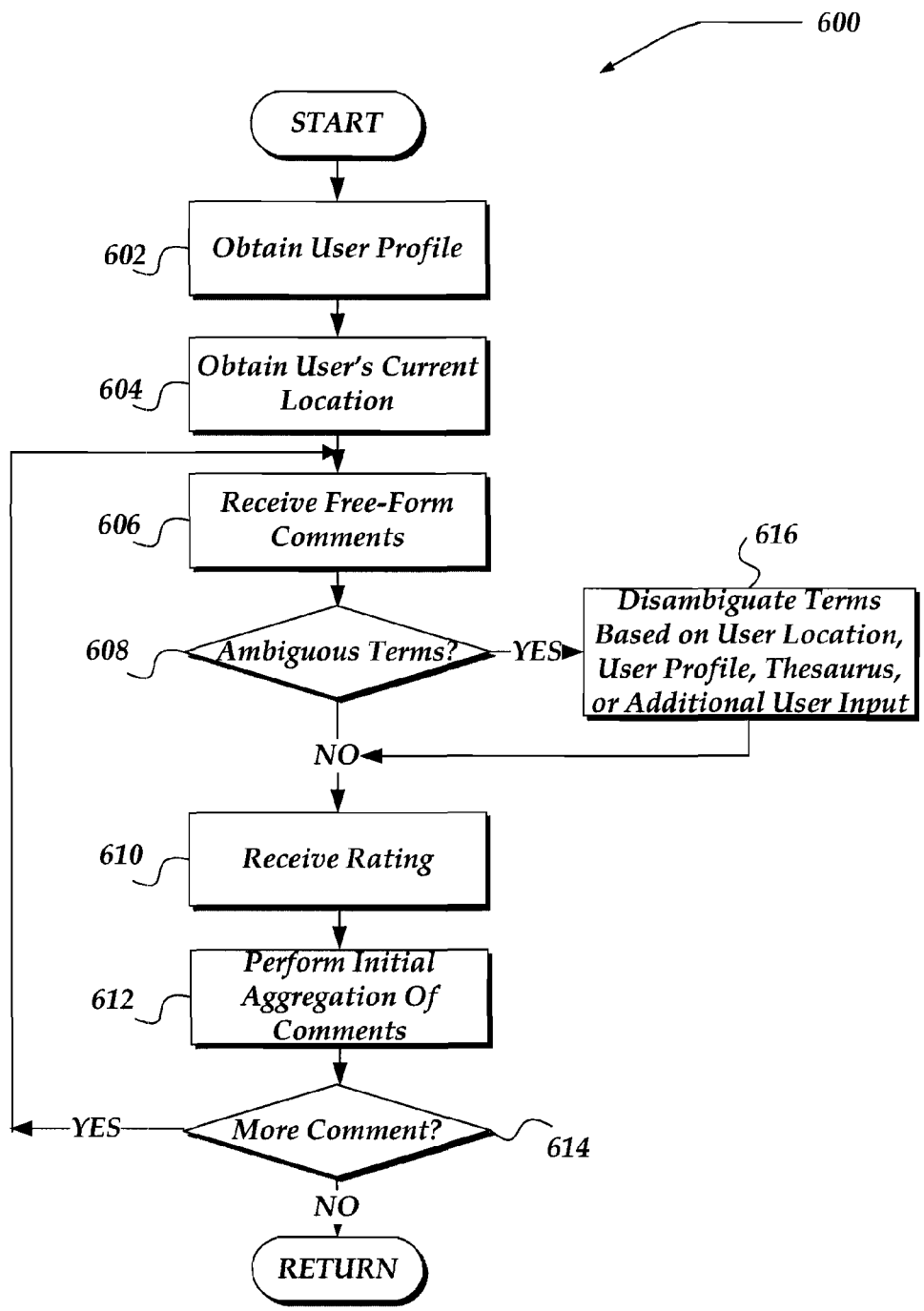
FIG. 6 illustrates a logical flow diagram generally showing one embodiment of a process for managing free-form context based ratings.

FIG. 6 illustrates a logical flow diagram generally showing one embodiment of a process for managing free-form context based ratings.

Process 600 of FIG. 6 begins, after a start block, at block 602, where, if available, a user's profile, social networking information, and the like, may be obtained. In one embodiment, the user's profile, social network, and the like, may be obtained from a data store, based on information the user may have provided, or obtained through the user's permission based on tracking a user's networking behaviors. Processing continues next to block 604, where a current location of the user may be determined. In one embodiment, the client device for which the user is using may provide such information. In one embodiment, the user might be asked.

Process 600 continues next to block 606, where the user may provide in free-form comments about virtually any product, service, business, or the like. In one embodiment, the user may employ a free-form interface such as described below in conjunction with FIG. 7.

Processing flows next to decision block 608 where a determination is made whether any of the terms may be ambiguous. If a term is determined to be ambiguous, processing flows to block 520 where disambiguation may be performed. In one embodiment, an attempt to disambiguate the term(s) may be performed based on the user's information, a thesaurus of known disambiguated terms for the user and/or similarly related users, or the like. In one embodiment, the user's current location might be employed to attempt to disambiguate the term(s). In any event, if disambiguation is not readily determined, in one embodiment, the user might be asked to clarify the term(s).

Processing then continues to block 610, where the user may select a rating. Processing then continues to block 612, where, in one embodiment, an initial aggregation of the user's input may be performed. Such initial aggregation may be performed to provide compute efficiencies. However, block 612 is optional, and may be performed at virtually any time, including, for example, when a search request is performed, based on a predefined aggregation schedule, or the like. In any event, processing proceeds to decision block 614 where a determination is made whether the user is to input more comments. If so, processing branches back to block 606; otherwise, processing returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Screen Shot of Free-Form Input Box

Figure 7:
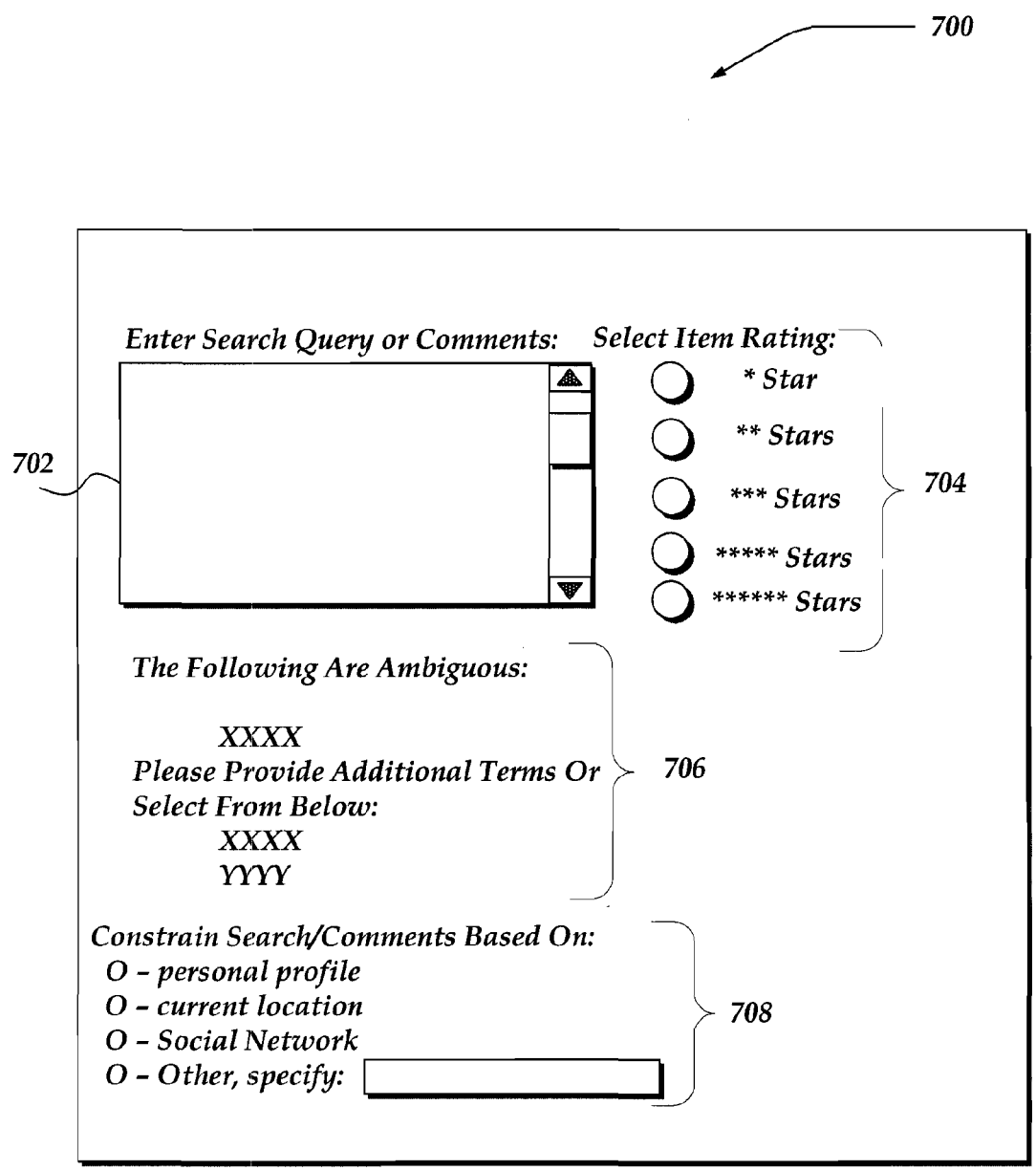
FIG. 7 illustrates a screen shot of one embodiment of a possible free-form input box, in accordance with the present invention.

FIG. 7 illustrates a screen shot of one embodiment of a possible free-form input box. Screen 700 may include many more or less components than those shown. The components shown, however, are sufficient to disclose an illustrative embodiment for practicing the invention.

As shown, screen 700 includes a free-form input window 702, rating selectors 704, disambiguators 706, and selectable constraints 708.

Free-form input window 702 represents one embodiment of a mechanism that is configured to enable a user to input in a free-form search query or comment terms. In one embodiment, window 702 may be configured to scroll, such that the user may provide several lines of terms. In one embodiment, however, window 702 might be constrained to a single line search query or comment.

Rating selectors 704 may include radio dials, dials, thermometers, or any of a variety of other mechanisms to enable a user to input a rating based on a defined range of values. As shown, rating selector 704 illustrates a star rating, however, the invention is not so constrained, and other rating expressions, icons, or the like, may also be used. Moreover, where the user selects not to provide a rating, the terms input into window 702 might be automatically interpreted as search terms. In one embodiment, however, another selector (not shown) might be provided that enables the user to identify whether the input is a search or a comment. Selection of the search might then, in one embodiment, dim, or otherwise disable rating selectors 704.

Disambiguators 706 illustrate one embodiment, of a mechanism for resolving ambiguous terms entered by the user. In one embodiment, where disambiguation might not be successful transparently to the user based on user information, location, social network information, or the like, disambiguators 706 might provide the ambiguous terms, and request clarification. As shown, in one embodiment, the user might select from a list of terms that might disambiguate the other terms. However, the user might also provide into window 702 a term to enable disambiguation.

Selectable constraints 708 represent one possible mechanism to enable the user to pro-actively constrain the search based on user information. As illustrated the user may select a category of user information for a list of categories, or provide additional information to constrain the search, comments, or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage a search query from a mobile device over a network, comprising:
   a transceiver to send and receive data over the network; and
   a processor that is operative to perform actions, including:
      providing to a user a free-form input box;
      receiving social networking information about the user;
      determining a current location of the user;
      receiving from the user a free-form search query;
      modifying the search query based in part on the social networking information, or the current location of the user;
      performing the modified search query; and
      providing a search result having a plurality of results, each result in the plurality of results including a weighted aggregated average rating that is based on weighting of contributing phrases, including sub-phrases, within relevant reviews, wherein the weighted aggregated average rating further comprises determining a weighting based on a fraction of words in a sub-phrase of words in the review over a total number of words contributing to a review associated with the search query.

2. The network device of claim 1, wherein receiving social networking information further comprises:
receiving at least one of a user preference profile, or information about the user's friends, family, or at least their first degree of separation contacts.

3. The network device of claim 1, wherein modifying the search query further comprises:
if at least one word within the search query is ambiguous, attempting to disambiguate the term based in part on the social networking information and the current location of the user.

4. The network device of claim 1, wherein the processor is operative to perform actions, further including:
enabling the user to select at least one additional social networking constraint, wherein the additional social networking constraint is employable to further modify the search query.

5. The network device of claim 1, wherein the processor is operative to perform actions, further including:
receiving from the user a free-form input of comments about at least one of a product, service, or business;
performing disambiguation on the comments based in part on the current location and social networking information; and
receiving a universal rating associated with the comments from the user.

6. A system that is operative to manage a search query over a network, comprising:
a data store configured to receive and manage user profiles and user social networking information; and
a universal search and rating manager that is in communication with the data store and is configured and arranged to perform actions, including:
receiving an identifier of a user;
employing the identifier to retrieve information about the user from the data store, including a user profile and user social networking information;
determining a current location of the user;
receiving from the user a free-form search query;
modifying the search query based in part on the social networking information, and the current location of the user;
performing the modified search query; and
providing a search result having a plurality of results, each result in the plurality of results including a weighted aggregated average rating that is based on weighting of contributing phrases, including sub-phrases, within relevant reviews, wherein the weighted aggregated average rating further comprises determining a weighting based on a fraction of words in a sub-phrase of words in the review over a total number of words contributing to a review associated with the search query.

7. The system of claim 6, wherein at least some of the social networking information is determined based on tracking an activity of the user over a network.

8. The system of claim 6, wherein modifying the search query further comprises:
if at least one word within the search query is ambiguous, attempting to disambiguate the term based in part on the social networking information and the current location of the user.

9. The system of claim 6, wherein the universal search and rating manager is configured to further perform actions, including:
receiving from the user a free-form input of comments about at least one of a product, service, or business;
performing disambiguation on the comments based in part on the user's current location and user's social networking information; and
receiving a universal rating associated with the comments from the user.

10. A non-transitory, computer-readable storage medium having computer-executable instructions for managing a universal ratings over a network, the computer-executable instructions when installed onto a computing device enable the computing device to perform actions, comprising:
receiving from a user a user's profile, and user's social networking information;
determining a current location of the user;
receiving from the user a free-form comment about at least one item of interest, wherein the comment includes at least one sub-phrase comprising one or more terms;
performing disambiguation on the comments based in part on the user's current location and user's social networking information;
receiving a universal rating associated with the comments from the user; and
determining a weighting for each sub-phrase within a comment based on a fraction of terms in each sub-phrase of one or more terms, in addition to the entire comment, over a total number of terms contributing to the comment, wherein the weighting further comprises determining a weighting based on a fraction of words in a sub-phrase of words in the comment over a total number of words contributing to the comment terms.

11. The non-transitory, computer-readable storage medium of claim 10, wherein the computing device performs actions, further comprising:
receiving from the user a free-form search query;
modifying the search query based in part on the user's social networking information, and the current location of the user;
performing the modified search query; and
providing a search result having a plurality of results, each result in the plurality of results including a weighted aggregated average rating based in part on the sub-phrase weightings of comments.

12. The non-transitory, computer-readable storage medium of claim 10, wherein performing disambiguation further comprises, enabling the user to provide at least one social networking constraint to further attempt to disambiguate the comment.

13. The non-transitory, computer-readable storage medium of claim 10, wherein the user is enabled to further provide a tag to at least one search result, wherein the search result comprises weighted average ratings for at least one other sub-phrase aggregated from a plurality of users' comments.

14. The non-transitory, computer-readable storage medium of claim 10, wherein receiving the universal rating further comprises identifying the received rating with the user.

15. A method, operating within a processor, of performing a search query over a network, comprising:
receiving social networking information about a user;
determining a current location of the user;
receiving from the user a free-form search query;
modifying the search query based in part on the social networking information, or the current location of the user;
performing the modified search query; and
providing a search result having a plurality of results, each result in the plurality of results including a weighted aggregated average rating that is based on weighting of contributing phrases, including sub-phrases, within relevant reviews, wherein the weighted aggregated average rating further comprises determining a weighting based on a fraction of words in a sub-phrase of words in the review over a total number of words contributing to a review associated with the search query.

16. The method of claim 15, the method further comprising:

receiving from the user a free-form input of comments about at least one of a product, service, or business;

performing disambiguation on the comments based in part on the user's current location and user's social networking information; and receiving a universal rating associated with the comments from the user.

17. The method of claim 15, wherein receiving social networking information further comprises having the user provide information within a survey.

18. The method of claim 15, wherein modifying the search query further comprises constraining the results of the search query to results based in part on input comments into a search data store from other users within a defined degree of separation from the user.

19. The method of claim 15, further comprising a computer-readable storage medium having stored thereon program instructions for performing the method of claim 15.

* * * * *